(12) United States Patent
Park et al.

(10) Patent No.: US 12,538,275 B2
(45) Date of Patent: Jan. 27, 2026

(54) METHOD AND APPARATUS FOR RADIO COMMUNICATION OF TIME SENSITIVE NETWORK

(71) Applicant: ELECTRONICS AND TELECOMMUNICATIONS RESEARCH INSTITUTE, Daejeon (KR)

(72) Inventors: Tae Joon Park, Daejeon (KR); Jae Sun Cha, Daejeon (KR); Eun Hee Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 412 days.

(21) Appl. No.: 18/084,937

(22) Filed: Dec. 20, 2022

(65) Prior Publication Data

US 2023/0199731 A1  Jun. 22, 2023

(30) Foreign Application Priority Data

Dec. 21, 2021  (KR) .......................... 10-2021-0184175
Dec. 9, 2022  (KR) .......................... 10-2022-0172037

(51) Int. Cl.
*H04W 72/0446* (2023.01)
*H04W 72/543* (2023.01)

(52) U.S. Cl.
CPC ..... *H04W 72/0446* (2013.01); *H04W 72/543* (2023.01)

(58) Field of Classification Search
CPC .......................... H04W 72/0446; H04W 72/543

USPC .......................................................... 370/337
See application file for complete search history.

(56) References Cited

U.S. PATENT DOCUMENTS

| | | | |
|---|---|---|---|
| 2012/0269161 A1* | 10/2012 | Chin | ..................... H04B 7/2618 370/335 |
| 2018/0184438 A1 | 6/2018 | Cavalcanti et al. | |
| 2020/0404697 A1 | 12/2020 | Yang et al. | |
| 2021/0022154 A1 | 1/2021 | Cavalcanti et al. | |
| 2021/0176788 A1* | 6/2021 | Shin | ..................... H04W 72/0453 |
| 2021/0329580 A1 | 10/2021 | Kim et al. | |
| 2021/0368522 A1 | 11/2021 | Barton et al. | |
| 2022/0116146 A1 | 4/2022 | Fang et al. | |
| 2022/0182881 A1* | 6/2022 | Suh | ..................... C12N 15/825 |
| 2023/0066731 A1* | 3/2023 | Gan | ..................... H04W 72/23 |
| 2023/0239080 A1* | 7/2023 | Marinier | ................. H04L 1/189 714/748 |
| 2023/0239817 A1* | 7/2023 | Lins | ..................... H04L 5/1469 370/503 |

(Continued)

FOREIGN PATENT DOCUMENTS

| KR | 10-2007-0023811 A | 2/2007 |
|---|---|---|
| KR | 10-2019-0122327 A | 10/2019 |

*Primary Examiner* — Faisal Choudhury
(74) *Attorney, Agent, or Firm* — LRK PATENT LAW FIRM (57) ABSTRACT

The present invention relates to a method and apparatus for radio communication of a time sensitive network. The method includes dividing, by the first node, a frame into a downlink section and an uplink section, transmitting, by the first node, downlink data to at least one second node in units of slots in the downlink section, and receiving, by the first node, uplink data from the at least one second node in units of slots in the uplink period.

17 Claims, 6 Drawing Sheets

(56) References Cited

U.S. PATENT DOCUMENTS

2024/0205166 A1* 6/2024 Bonneville ........... H04L 47/283
2024/0283494 A1* 8/2024 Yu ....................... H04B 7/0417

* cited by examiner

| DPH | GI (0.8μs) | DTF (3.2μs) |

FIG. 5

| UPH | GI (0.8µs) | UTF (3.2µs) |

FIG. 6

METHOD AND APPARATUS FOR RADIO COMMUNICATION OF TIME SENSITIVE NETWORK

CROSS-REFERENCE TO RELATED APPLICATIONS

This application claims priority to and the benefit of Korean Patent Application No. 10-2021-0184175 filed on Dec. 21, 2021, and No. 10-2022-0172037 filed on Dec. 9, 2022, the disclosure of which is incorporated herein by reference in its entirety.

BACKGROUND

1. Field of the Invention

The present invention relates to a method and apparatus for radio communication of a time sensitive network, and more particularly, to a method and apparatus for radio communication of a time sensitive network using a time division multiple access (TDMA) scheme in a wireless time sensitive network.

2. Description of Related Art

For real-time monitoring and control at industrial manufacturing sites, an Ethernet-based time sensitive network (TSN) is applied to provide a deterministic service having low latency, low delay variation, and low loss. Although the TSN has operated based on a wired network, it is necessary to apply wireless communication in places where wired communication with sensors and actuators for real-time monitoring and control is difficult.

On the other hand, the current WiFi (IEEE Std 802.11-2016) technology extracts a carrier frequency error and a symbol timing error of a transmitting node using a preamble of a physical layer when it is necessary to transmit/receive data, and transmits physical channel information for data reception such as appropriate amplification according to the strength of the received signal. In a WiFi-based communication system, a preamble is essential for data transmission/reception.

In addition, it is necessary to continuously transmit data with a sufficiently short cycle (e.g., 125 μs) for closed-loop control of production processes, robot control, and the like for recent industrial automation.

However, as in the conventional WiFi technology, there is a problem in that, when a size of data to be transmitted is smaller than that of the preamble, the efficiency of data transmission is lowered and, when a cycle is sufficiently short (e.g., 125 μs), a short cycle for data transmission may not be satisfied due to the time required for preamble transmission.

The background technology of the present invention is disclosed in Korean Patent Publication No. 10-2007-0023811 (published on Feb. 8, 2007).

SUMMARY OF THE INVENTION

The present invention is directed to providing a method and apparatus for radio communication of a time sensitive network capable of controlling data transmission/reception between an access point (AP) and a plurality of terminals using a time division multiple access (TDMA) scheme in a wireless time sensitive network of an industrial closed-loop control level.

According to an aspect of the present invention, there is provided a method of radio communication of a time sensitive network (TSN) in a method of operating a first node for the TSN, the method including: dividing, by the first node, a frame into a downlink section and an uplink section; transmitting, by the first node, downlink data to at least one second node in units of slots in the downlink section; and receiving, by the first node, uplink data from the at least one second node in units of slots in the uplink period.

In the dividing, the first node may allocate a slot indicating a downlink transmission order and a slot indicating an uplink transmission order of the at least one second node.

The downlink section may include: a preamble part; and a downlink data section including the downlink data in units of slots for each of the at least one second node, and the downlink data may include a downlink header (DownlinkPHY header (DPH)) and a data field (MAC protocol data unit (MPDU)).

In the downlink data section, downlink data of a first slot may include an Urtdn SIGnalling (U-Sig) header and the data field (MAC protocol data unit (MPDU)).

The downlink section may further include an end of downlink (EOD) after the downlink data section, and the EOD field may be used to indicate uplink and downlink transmission switching and switch between transmission and reception modes after continuous downlink data transmission.

The downlink header (DPH) may include a guard interval (GI) and a downlink training field (DTF).

The uplink section may include an uplink data section including the uplink data in units of slots for each of the at least one second node, and the uplink data may include an uplink header (uplink PHY header (UPH)) and a data field (MAC protocol data unit (MPDU)).

The uplink header (UPH) may include a guard interval (GI) and an uplink training field (UTF).

In the transmitting of the downlink data in units of slots, the first node may transmit a preamble only before transmitting the downlink data in the first slot.

In the receiving of the uplink data in units of slots, the first node may transmit the uplink data from the at least one second node in units of slots with an end of downlink (EOD) after continuous downlink data transmission.

According to another aspect of the present invention, there is provided a method of radio communication of a TSN in a method of operating at least one second node for the TSN, the method including: receiving, by the at least one second node, downlink data in units of slots from a first node in a downlink section of a frame; and transmitting, by the at least one second node, uplink data to the first node in units of slots in an uplink section of the frame.

The downlink section may include: a preamble part; and a downlink data section including the downlink data in units of slots for the at least one second node, and the downlink data may include a downlink header (DownlinkPHY header (DPH)) and a data field (MAC protocol data unit (MPDU)).

In the downlink data section, downlink data of a first slot may include an Urtdn SIGnalling (U-Sig) header and the data field (MAC protocol data unit (MPDU)).

The downlink period may further include an end of downlink (EOD) after the downlink data section, and the EOD field may be used to indicate uplink and downlink transmission switching and switch a transmission/reception mode after continuous downlink data reception.

The downlink header (DPH) may include a guard interval (GI) and a downlink training field (DTF).

The uplink section may include an uplink data section including the uplink data in units of slots for each of the at least one second node, and the uplink data may include an uplink header (uplink PHY header (UPH)) and a data field (MAC protocol data unit (MPDU)).

The uplink header (UPH) may include a guard interval (GI) and an uplink training field (UTF).

In the transmitting of the uplink data in units of slots, the second node of a first slot in the uplink section may transmit the corresponding uplink data to the first node in a first slot with an EOD period after continuous downlink data reception. According to still another aspect of the present invention, there is provided an apparatus for radio communication of a TSN, including: a memory; a transceiver; and a processor connected to the memory and the transceiver, in which the processor divides a frame into a downlink section and an uplink section, transmits downlink data to at least one second node through the transceiver in units of slots in the downlink section, and receives uplink data from the at least one second node in units of slots in the uplink section.

The processor may transmit a preamble only before transmitting the downlink data in a first slot in the downlink section.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of a method and apparatus for radio communication of a time sensitive network according to the present invention will be described with reference to the accompanying drawings. In this process, thicknesses of lines, sizes of components, and the like, illustrated in the accompanying drawings may be exaggerated for clearness of explanation and convenience. In addition, terms to be described below are defined in consideration of functions in the present disclosure and may be construed in different ways by the intention of users or practice. Therefore, these terms should be defined on the basis of the contents throughout the present specification.

An access point (AP) described in this specification may be a first node, and a terminal may be a second node.

Figure 1:
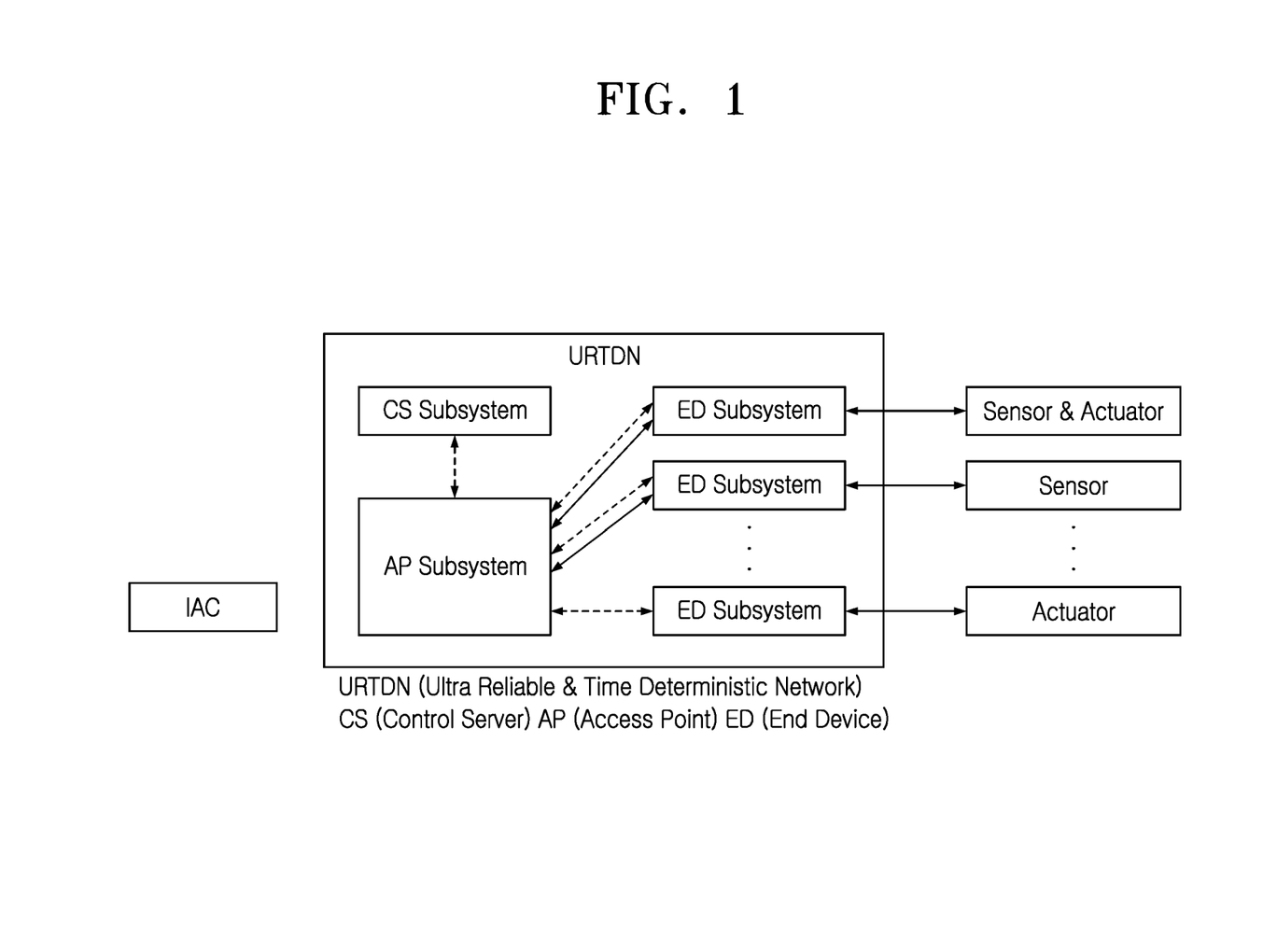
FIG. 1 is a conceptual diagram for explaining a system for radio communication of a time sensitive network according to an embodiment of the present invention.

FIG. 1 is a conceptual diagram for describing a configuration of a system for radio communication of a time sensitive network according to an embodiment of the present invention.

Referring to FIG. 1, the system for radio communication of a time sensitive network according to the embodiment of the present invention is an ultra-reliable & time deterministic network (URTDN), and the URTDN includes a control server (CS) subsystem (hereinafter, referred to as "control server"), an access point (AP) subsystem (hereinafter, referred to as "AP"), and a plurality of end device (ED) subsystems (hereinafter, referred to as "terminal").

The control server may form and control a network between the AP and terminals.

The AP may transmit data and control information from the control server to the terminals or transmit the data and control information from the terminals to the control server.

The terminal may transmit/receive sensor and actuator information to and from the AP. Each terminal may include a sensor and/or actuator or may be connected to the sensor and/or actuator.

Meanwhile, in the URTDN, an industrial closed-loop control level operation is required between the AP and the plurality of terminals. In addition, in the URTDN, the plurality of terminals are connected to the AP in a time division multiple access (TDMA) scheme. Accordingly, the present invention provides a frame structure for TDMA control between the AP and the plurality of terminals for wireless TSN data transmission/reception at an industrial closed-loop control level and a wireless communication method using the same. In particular, in order to transmit large-scale small data (packets) of short-cycle deterministic low-latency characteristics generated by the plurality of terminals for the wireless TSN communication, a method of enabling data transmission/reception with only minimum cyclic channel information without using a conventional method requiring overhead such as a preamble for each terminal is provided.

To this end, the AP may allocate a slot to each terminal and sequentially (without a time interval) perform downlink transmissions for the terminals. In this case, the AP may transmit the preamble only before transmitting the downlink data of the first slot. In addition, the AP may sequentially (without a time interval) perform the uplink receptions for the terminals after an end of downlink after the downlink transmissions are terminated. The AP divides a slot to specify the time at which the terminals access the channel and allocates the slot to each terminal. In each slot, the channel access of the terminal may operate in TDMA. In the case of the TDMA, slot resources are allocated only to a specific terminal, and channel access may be performed directly in a slot allocated to a specific terminal.

Figure 2:
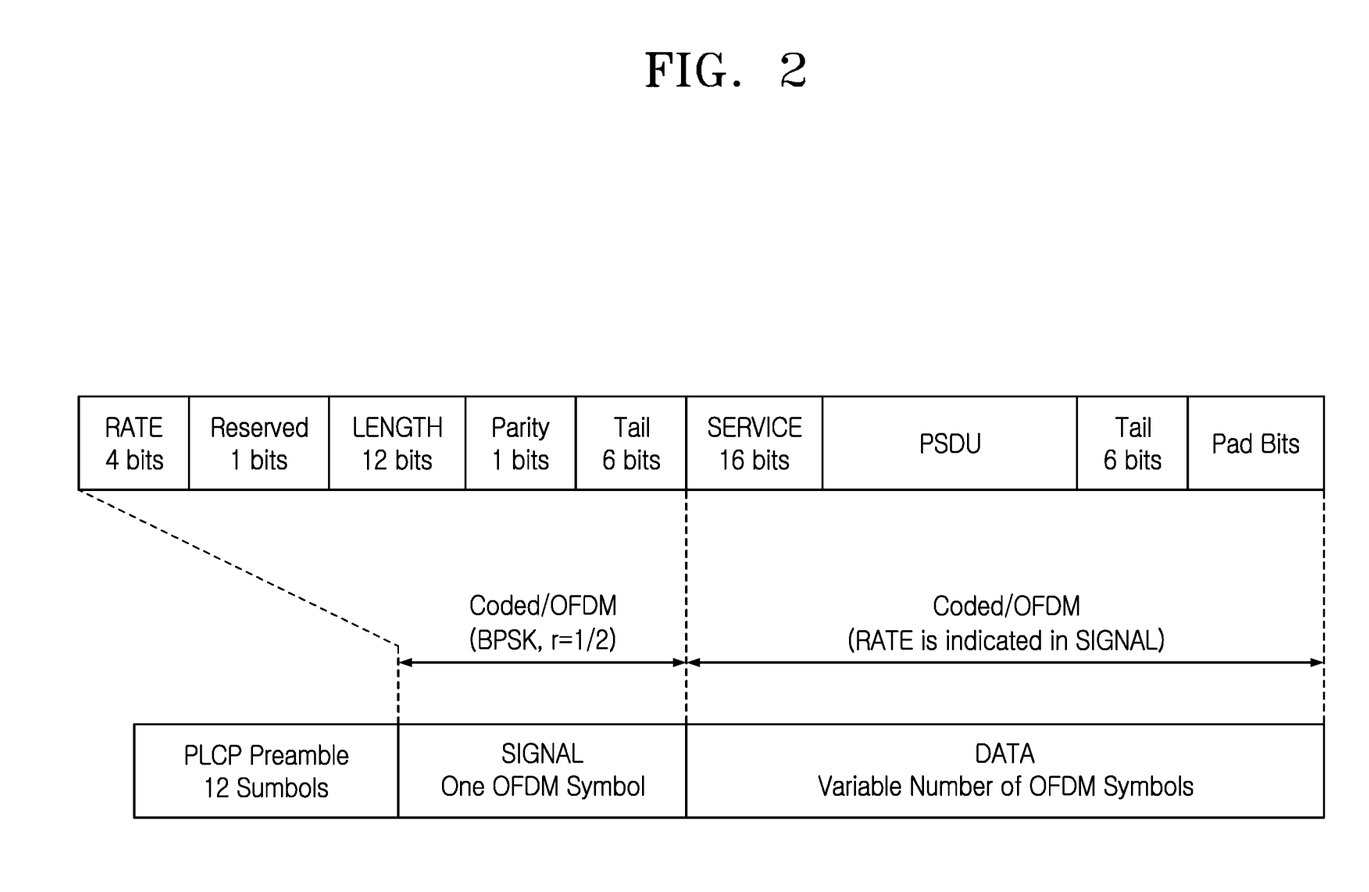
FIG. 2 is a diagram illustrating a structure of a physical layer frame defined in the existing IEEE 80211 standard.

FIG. 2 is a diagram illustrating a structure of a physical layer frame defined in the existing IEEE 80211 standard.

Referring to FIG. 2, the physical layer frame according to the IEEE 80211 standard may include a preamble, a control signal, and a data section. For example, the control signal may be a legacy signal field (L-SIG) used in an IEEE80211 (a/g/n) frame. In this case, the L-SIG may have a length of 4 usec. Meanwhile, the control signal may have various fields (e.g., RATE, Reserved, LENGTH, Parity, Tail, etc.), but a description thereof will be omitted.

The preamble may include a legacy short training field (L-STF) 211 and a legacy long training field (L-LTF) 212 used in the IEEE80211 (a/g/n) frame. In this case, the L-STF may have a length of 8 usec, and the L-LTF may have a length of 8 usec. The L-STF is used for auto gain control (AGC) and coarse time synchronization in each terminal, and the L-LTF is used for fine time synchronization, frequency compensation, and channel estimation for data demodulation in each terminal.

In the conventional WiFi-based communication system, a preamble is essential for data transmission/reception. However, it is necessary to continuously transmit data with a sufficiently short cycle (e.g., 125 μs) for closed-loop control of production processes, robot control, and the like for recent industrial automation. However, when a size of data to be transmitted is small compared to that of the preamble, the data transmission efficiency is low, and when the cycle is sufficiently short (e.g., 125 μs), due to the time required for the preamble transmission, the short cycle for data transmission may not be satisfied.

For example, assuming a system in which one AP needs to ensure a deterministic data transmission/reception opportunity for 120 terminals in a 2 ms cycle, the smaller the size of the user data, the larger the overhead due to the preamble, resulting in a problem of lowering the transmission efficiency. This problem is not simply limited to the problem of efficiency, but causes a structural problem in that the number of terminals that can be accommodated is extremely limited due to the limited number of packets that may be transmitted in a short cycle (2 ms).

Accordingly, the present invention may apply a method of multiplexing and transmitting transmission/reception data between an AP and a terminal into one frame. The frame aggregation technology of the existing WiFi is applicable only to the downlink transmission that transmits data from the AP to the terminal, and as the number of downlink channel connections increases, there is a problem in that the accuracy of the channel information confirmed by the legacy preamble is lowered. In addition, since the frame aggregation technology of the existing WiFi transmits data from different terminals to the AP in the case of the uplink transmitting data from the terminal to the AP, there is a problem in that the uplink frame may not apply the frame aggregation technology to the downlink.

The present invention may apply the concept of the frame aggregation to the uplink as well as the downlink by multiplexing and transmitting the transmission/reception data between the AP and the terminal into one frame. The frame aggregation of the present invention includes cyclical channel information that maintains the accuracy of channel information even if the number of downlink connections increases. For the uplink data transmitted from different terminals to the AP, the transmission starts at the reserved time by TDMA including brief channel information of each terminal, so all the terminals do not need to use the preamble.

Figure 3:
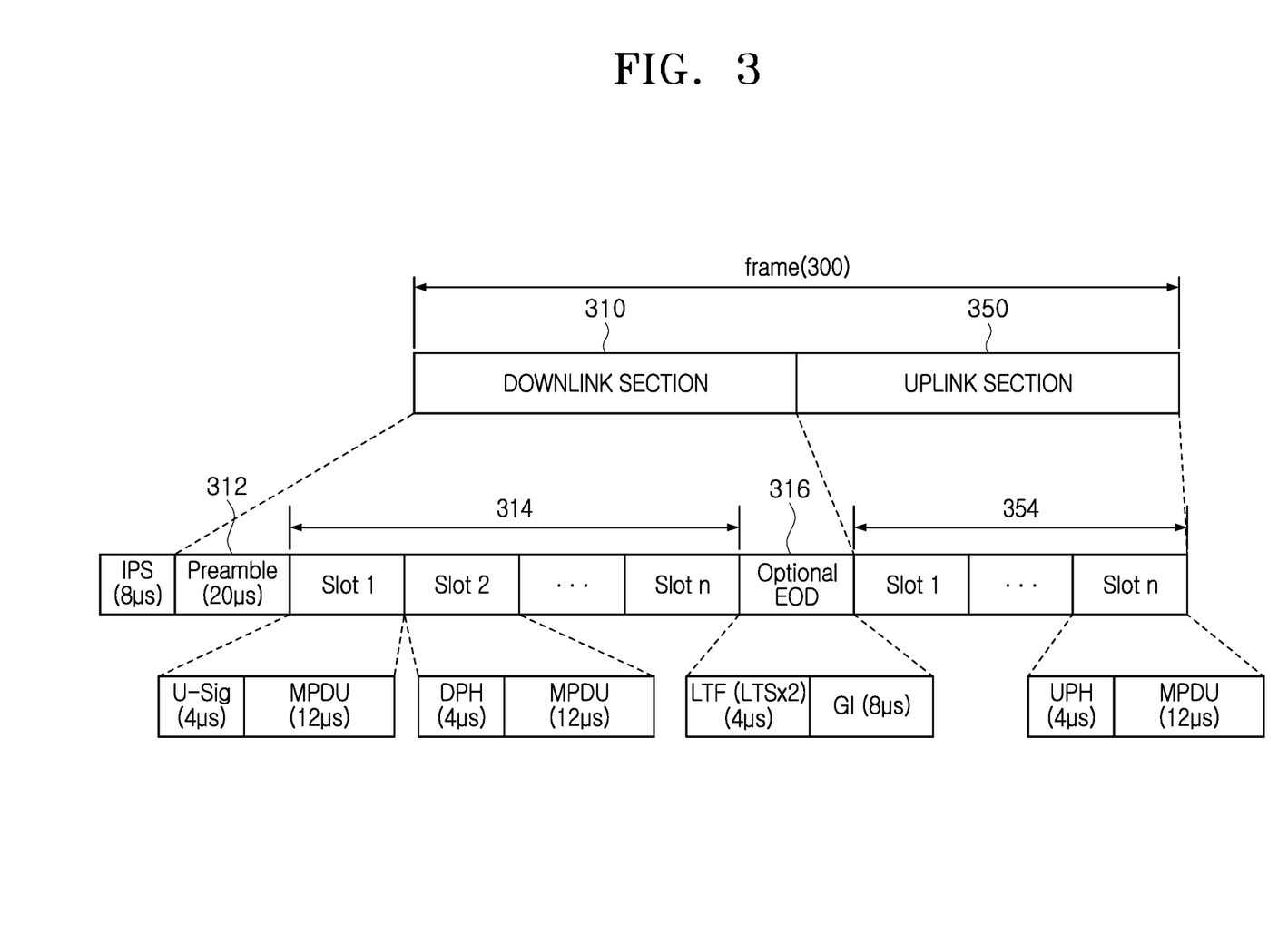
FIG. 3 is an exemplary diagram illustrating a structure of an uplink and downlink frame according to an embodiment of the present invention.
Figure 4:
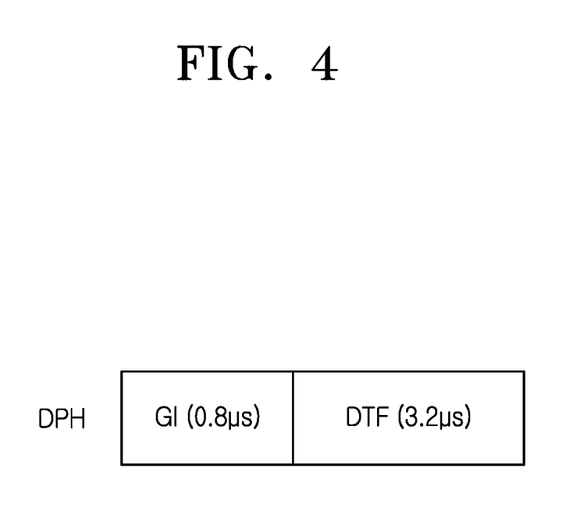
FIG. 4 is an exemplary diagram illustrating a structure of a downlink header according to an embodiment of the present invention.
Figure 5:
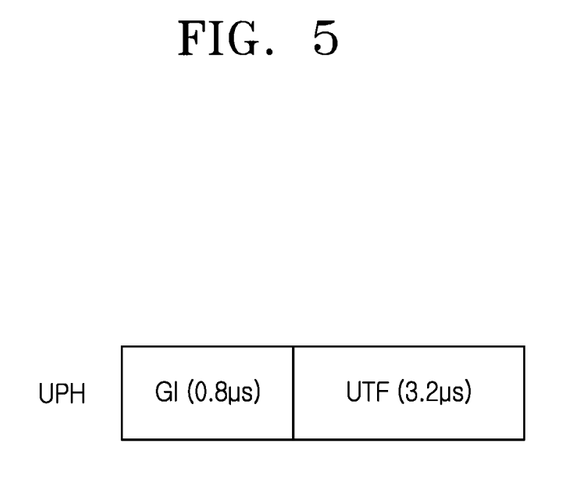
FIG. 5 is an exemplary diagram illustrating a structure of an uplink header according to an embodiment of the present invention.

FIG. 3 is an exemplary diagram illustrating a structure of an uplink and downlink frame according to an embodiment of the present invention, FIG. 4 is an exemplary diagram illustrating a structure of a downlink header according to an embodiment of the present invention, and FIG. 5 is an exemplary diagram illustrating a structure of an uplink header according to an embodiment of the present invention.

Referring to FIG. 3, an uplink and downlink frame 300 according to the embodiment of the present invention is a TDMA frame composed of a downlink section for transmitting data from an AP to a terminal and an uplink section for transmitting data from the terminal to the AP, and may include a downlink section 310 and an uplink section 350.

The downlink section 310 is a section in which data is transmitted from the AP to the terminal, and includes a preamble section 312 and a downlink data section 314, and the downlink data section 314 is divided into the number of slots corresponding to the number of terminals.

The preamble section 312 may be located in a front part of a first slot slot 1 in the downlink section 310.

The AP may transmit a preamble only in a front part of a first downlink data transmission without needing to include the preamble in all downlink transmissions for the terminals. For example, the AP may transmit the preamble only in the front part of the downlink data of the first slot slot 1. Accordingly, the AP may transmit the preamble only once and receive only a data field for each terminal without a preamble during uplink transmission as well as downlink transmission for each terminal.

The preamble may be used for AGC, coarse time synchronization, fine time synchronization, frequency compensation, and channel estimation for data demodulation in each terminal. This preamble may have a length of, for example, 20 μs.

The preamble is the same for compatibility with conventional IEEE802.11 WiFi, and physical layer parameters are the same as IEEE802.11 WiFi in Table 1 below, except that a pilot subcarrier is used for user data.

TABLE 1

| Parameters | Values |
|---|---|
| Signal bandwidth | 20 MHz |
| Carrier frequency | 2.4 GHz |
| FFT size | 64 |
| SCS (Subcarrier spacing) | 312.5 kHz |
| The number of active subcarrier | 52 (48 data + 4 pilot) |
| OFDM symbol duration | 3.2 μs |
| Guard interval (CP Cyclic Prefix) | 0.8 μs |
| Total OFDM symbol duration | 4.0 μs |
| Modulation | QPSK |

The downlink data section 314 is composed of a plurality of slots (slot 1, slot 2, . . . , slot n) and may include downlink data for each terminal in units of slots. Here, the fact that the downlink data section 314 is composed of n number of slots, in which n is not predetermined, means that one downlink data section 314 is composed of one or more slots, and the number of slots is not intended to limit the spirit of the present invention.

The downlink data section 314 may include downlink data in units of slots for each of at least one terminal.

Since the downlink section 310 that transmits data from the AP to the terminal applies a frame aggregation method of aggregating and transmitting downlink data transmitted to different terminals, the downlink data section 314 may include downlink data for each of a plurality of terminals (e.g., 120 terminals). For example, when the AP is connected to 120 terminals, the downlink data section 314 is composed of 120 slots, and the AP may transmit corresponding downlink data to the corresponding terminal in each slot.

The downlink data may include a downlink header (DownlinkPHY header (DPH)) and a data field (MAC protocol data unit (MPDU)). In this case, since the first slot slot 1 does not require additional channel information according to the channel information confirmation by the preamble, the downlink header of the first slot slot 1 may be used as an Urtdn SIGnalling (U-Sig) header. That is, the downlink data of the first slot slot 1 in the downlink data section 314 may include the Urtdn SIGnalling (U-Sig) header and the data field (MAC protocol data unit (MPDU)). Here, the U-Sig may be a control signal field for the URTDN and may have a length of 4 μs.

The downlink data after the first slot slot 1 may include the downlink header (DownlinkPHY header (DPH)) and the data field (MAC protocol data unit (MPDU)). Small data to be transmitted to different terminals of downlink in slots after the first slot slot 1 may use the downlink header (DownlinkPHY header (DPH)) to confirm transmission path characteristics such as channel attenuation and phase error, and adjust amplification control, offset/phase error, and the like.

As illustrate in FIG. 4, the downlink header (DPH) may include a guard interval (GI) and a downlink training field (DTF).

The GI may be determined by reflecting uncertainty due to frequency offset and transmission latency. The GI may reflect the maximum error, the maximum transmission latency, and the like that may occur due to frequency offset in the URTDN having isochronism where time information is resynchronized cyclically. This GI may have a length of, for example, 0.8 μs.

The DTF may be used for time/frequency synchronization and channel response estimation. This DTF may have a length of, for example, 3.2 μs.

The downlink header (DPH) composed of the GI and DTF may have a length of, for example, 4 μs.

The downlink data section 314 may repeatedly cyclically transmit a downlink header (DPH) for robustness to channel environments such as multipath fading. That is, the AP may add a downlink header (DPH) into downlink data for each slot to transmit the downlink data.

The downlink header (DPH) of the downlink data configured as described above may be used to transmit information from the AP to each terminal. That is, the information on the channel attenuation, the frequency offset, and/or the phase error experienced by each terminal, which are measured by the AP based on the downlink data transmitted by each terminal, may be transmitted to each terminal using the downlink header (DPH) of the downlink data. Each terminal may correct its own uplink transmission using the information transmitted through the downlink header (DPH) of the downlink data. That is, the offset and transmit power of each terminal may be corrected using the downlink header (DPH) of the downlink data so that the AP may easily receive uplink data.

The data field (MAC protocol data unit (MPDU)) of the downlink data may include data to be transmitted from the AP to the corresponding terminal. In order to provide a latency time deterministic service, it may be preferable to allocate a data field of the same size to all the terminals. The data field (MPDU) of the downlink data may have a length of, for example, 12 μs.

Meanwhile, the downlink section 310 according to the present invention may further include an end of downlink (EOD) 316 indicating the termination of the downlink transmission. The EOD 316 may be used to indicate uplink and downlink transmission switching and switch between transmission and reception modes of information for channel estimation after continuous downlink data transmission is complete.

The EOD 316 may include a long training field (LTF) and a guard interval (GI). The EOD 316 has a length of 16 μs, and the long training field LTF and guard interval (GI) may each have a length of 8 μs.

The long training field LTF may be used for the time synchronization, the frequency compensation, and the channel estimation.

The downlink section 310 configured as described above may reduce overhead due to the preamble compared to the conventional method in which the preamble is transmitted to each downlink data.

The AP may allocate a slot for each terminal and sequentially (without a time interval) transmit downlink data of the corresponding terminal in each slot. In this case, the AP may transmit the preamble only before the transmission of the downlink data of the first slot slot 1.

When the downlink transmission of the AP is completed, each terminal may transmit uplink data to the AP in a slot allocated to itself in the uplink section. In this case, the terminal in the first slot slot 1 in the uplink section may transmit the corresponding uplink data to the AP in the first slot slot 1 after the lapse of the EOD field 316. Then, the AP may perform the uplink reception for the terminals sequentially (without a time interval) by receiving the uplink data from the terminals in units of slots after the lapse of the EOD 316 after the downlink transmission is completed.

In the present invention, even for uplink data transmission, high transmission efficiency at the level of frame aggregation may be obtained through preamble simplification.

In the uplink and downlink frame 300 according to the present invention, the uplink section 350 is a section in which data is transmitted from the terminal to the AP, and includes the uplink data section 354, and the uplink data section 354 is divided into slots corresponding to the number of terminals.

The uplink data section 354 is composed of a plurality of slots slot 1, slot 2, . . . , slot n and may include uplink data for each terminal in units of slots. Here, the fact that the downlink data section 354 is composed of n number of slots, in which n is not predetermined, means that one downlink data section 354 is composed of one or more slots, and the number of slots is not intended to limit the spirit of the present invention.

The downlink data section 354 may include downlink data in units of slots for each of at least one terminal. For example, when the AP is connected to 120 terminals, the uplink data section 354 is composed of 120 slots, and each slot may include uplink data of each of the 120 terminals.

The uplink data of each terminal may include an uplink header (uplink PHY header (UPH)) and a data field (MAC protocol data unit (MPDU)).

The uplink header (UPH) is a header applied to each terminal, and may be located in a first symbol of a data section transmitted from each terminal to the AP. The uplink header (UPH) may have a length of 4 μs, and the data field (MPDU) may have a length of 120 μs.

In order to efficiently transmit small data generated from different uplink terminals, the uplink header (UPH) may be transmitted instead of a preamble. In this way, the characteristics of the transmission path such as the channel attenuation and the phase error may be confirmed, and the amplification control, the offset/phase error, etc., may be adjusted.

As illustrated in FIG. 5, the uplink header (UPH) may include a guard interval (GI) and an uplink training field (UTF).

The GI is used to increase the probability of successful reception of URTDN data, and may be determined by reflecting uncertainty due to the frequency offset, the transmission latency, etc. The GI may reflect the maximum error, the maximum transmission latency, and the like that may occur due to frequency offset in the URTDN having isochronism where time information is resynchronized cyclically.

The GI may have a length of, for example, 0.8 µs.

The UTF may be used for time/frequency synchronization and channel response estimation. That is, the UTF preamble may be used for the AGC, the coarse time synchronization, the fine time synchronization, the frequency compensation, the channel estimation for data demodulation, etc., in each terminal.

This UTF may have a length of, for example, 3.2 µs.

The data field (MAC protocol data unit (MPDU)) of the uplink data may include data to be transmitted from the terminal to the AP. In order to provide a latency time deterministic service, it may be preferable to allocate a data field of the same size to all the terminals. The data field (MPDU) of the uplink data may have a length of, for example, 12 µs.

In the uplink transmission that transmits data to the AP, the uplink data composed of the uplink header (uplink PHY header (UPH)) and the data field (MAC protocol data unit (MPDU)) after the lapse of the EOD 316 after the last downlink slot.

Each terminal may transmit the uplink data to the AP in the allocated slot. The AP may receive the uplink data in the slot allocated to each terminal. In this case, the AP may receive the uplink data in units of slots (consecutively) from a plurality of terminals at intervals of the EOD 316 after the continuous downlink transmission.

Since the uplink and downlink frame 300 configured as described above uses the downlink header (DPH) for the downlink and the uplink header (UPH) for the uplink, the same OFDM symbol as IEEE80211 WiFi in Table 1 is used except that the pilot subcarrier is used for the data transmission. Here, a specific implementation method of acquiring channel information of a transmission path is generally known, and is not described in detail in the present invention.

In addition, for the real-time closed-loop control such as the robot control for industrial automation, the uplink and downlink frame 300 according to the present invention may allow small-sized data consecutively generated in multiple connections to be transmitted to one channel in uplink and downlink time division with a very short transmission cycle which may not be supported by the existing WiFi physical layer technology required for using the preamble for each terminal. That is, the present invention allows small data consecutively generated in multiple connections to be transmitted to one channel in the uplink and downlink time division with a very short transmission cycle for the deterministic low-latency characteristics.

As such, the present invention can transmit a large amount of small data consecutively generated in a timely manner in multiple connections with a very short transmission cycle, which could not be supported by the existing WiFi technical specifications, thereby enabling the real-time closed-loop control such as the robot control for industrial automation, and one AP may ensure the deterministic data transmission/reception opportunity for 120 terminals in a 2 ms cycle.

Figure 6:
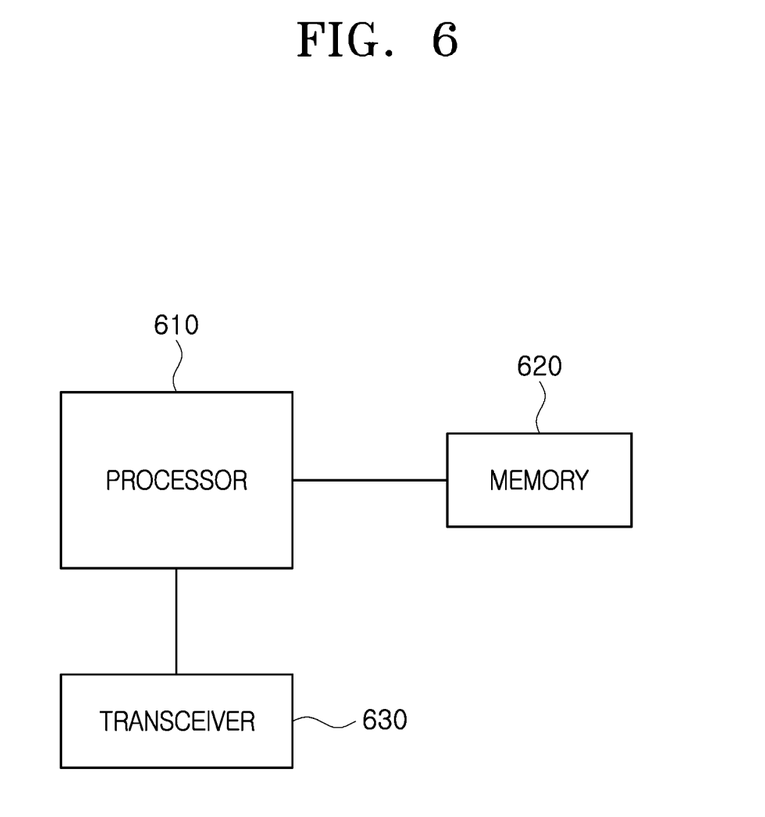
FIG. 6 is a block diagram for describing a configuration of an apparatus for radio communication of a time sensitive network according to an embodiment of the present invention.

FIG. 6 is a block diagram for describing a configuration of an apparatus for radio communication of a time sensitive network according to an embodiment of the present invention.

Referring to FIG. 6, the apparatus for radio communication of a time sensitive network according to an embodiment of the present invention may include a processor 610, a memory 620, and a transceiver 630.

The apparatus for radio communication of a time sensitive network may be a node, that is, an access point.

The processor 610 may divide a frame into a downlink section and an uplink section, transmit downlink data to at least one terminal in the downlink section through a transceiver in units of slots, and receive uplink data from at least one terminal in units of slots in the uplink section. In this case, the processor 610 may transmit the preamble only before the downlink data transmission of the first slot in the downlink section. In addition, the processor 610 may receive uplink data in units of slots from at least one terminal during an EOD after the continuous downlink data transmission. Instructions for implementing these functions may be stored in the memory 620. In addition, setting information such as a TDMA timeslot length described in this embodiment may be stored in the memory 620.

The transceiver 630 may be implemented as a transceiver or the like to transmit/receive a radio signal, and for example, a physical layer of IEEE 802.11 may be implemented.

The processor 610 and/or transceiver may include an application-specific integrated circuit (ASIC), other chipsets, logic circuits, and/or data processing devices. The memory 620 may include a read-only memory (ROM), a random access memory (RAM), a flash memory, a memory card, a storage medium, and/or other storage devices. When the embodiment is implemented in software, the above-described technique may be implemented as a module (process, function, and the like) performing the above-described function. The module is stored in the memory 620 and can be executed by the processor 610. The memory 620 may be inside or outside the processor 610 and may be connected to the processor 610 by various means.

According to a method and apparatus for radio communication of a time sensitive network according to the present invention, by controlling data transmission/reception between an AP and a plurality of terminals using a TDMA scheme, it is possible to transmit a large amount of small data consecutively generated in a timely manner with a very short transmission cycle in multiple connections to perform real-time closed-loop control such as robot control for industrial automation.

In addition, according to a method and apparatus for radio communication of a time sensitive network according to the present invention, by configuring an uplink and downlink frame composed of a downlink for transmitting data from an AP to a terminal and an uplink for transmitting data from the terminal to the AP, it is possible to ensure an opportunity for one AP to transmit/receive deterministic data to and from a plurality of terminals (e.g., 120 terminals) with a very short transmission cycle (e.g., 2 ms).

Although the present invention has been described with reference to embodiments shown in the accompanying drawings, it is only exemplary. It will be understood by those skilled in the art that various modifications and equivalent other exemplary embodiments are possible from the present invention. Accordingly, a true technical scope of the present invention is to be determined by the spirit of the appended claims.

What is claimed is:

1. A method of radio communication of a time sensitive network (TSN) in a method of operating a first node for the TSN, the method comprising:
    dividing, by the first node, a single frame into a downlink section and an uplink section, wherein the downlink section includes a plurality of downlink-dedicated slots and the uplink section includes a plurality of uplink-dedicated slots;

transmitting, by the first node, downlink data to at least one second node in units of slots in the downlink section; and receiving, by the first node, uplink data from the at least one second node in units of slots in the uplink section, wherein the downlink section includes one preamble and a downlink data section including the downlink data in units of slots for each of the at least one second node, wherein the uplink section includes an uplink data section including the uplink data in units of slots for each of the at least one second node, wherein the one preamble, the downlink data section and the uplink data section are comprised in the single frame, in the transmitting of the downlink data in units of slots in the downlink section, the first node transmits the one preamble only once before transmitting the downlink data in a first slot of the plurality of downlink-dedicated slots, with no preamble sent in the subsequent slots, in the receiving of the uplink data in units of slots in the uplink section, the first node does not receive any preamble from the at least one second node, wherein downlink data of the first slot of the plurality of downlink-dedicated slots includes an Urtdn SIGnalling (L-Sig) header and a data field (MAC protocol data unit (MPDU)).

2. The method of claim 1, wherein, in the dividing, the first node allocates a slot indicating a downlink transmission order and a slot indicating an uplink transmission order of the at least one second node.

3. The method of claim 1,
wherein downlink data of remaining slots of the plurality of downlink-dedicated slots except the first slot includes DownlinkPHY header (DPH) and a data field (MAC protocol data unit (MPDU)).

4. The method of claim 3, wherein the downlink section further includes an end of downlink (EOD) field after the downlink data section, and
the EOD field is used to indicate uplink and downlink transmission switching and to switch between transmission and reception modes after continuous downlink data transmission.

5. The method of claim 3, wherein the downlink header (DPH) includes a guard interval (GI) and a downlink training field (DTF).

6. The method of claim 1, wherein
the uplink data includes an uplink header (uplink PHY header (UPH)) and a data field (MAC protocol data unit (MPDU)).

7. The method of claim 6, wherein the uplink header (UPH) includes a guard interval (GI) and an uplink training field (UTF).

8. The method of claim 1, wherein, in the receiving of the uplink data in units of slots, the first node receives the uplink data from the at least one second node in units of slots after an end of downlink (EOD) following continuous downlink data transmission.

9. A method of radio communication of a time sensitive network (TSN) in a method of operating at least one second node for the TSN, the method comprising:
receiving, by the at least one second node, downlink data in units of slots from a first node in a downlink section of a single frame; and
transmitting, by the at least one second node, uplink data to the first node in units of slots in an uplink section of the frame, wherein the frame is divided into the downlink section and the uplink section, wherein the downlink section includes a plurality of downlink-dedicated slots and the uplink section includes a plurality of uplink-dedicated slots, wherein the downlink section includes one preamble and a downlink data section including the downlink data in units of slots for each of the at least one second node, wherein the uplink section includes an uplink data section including the uplink data in units of slots for each of the at least one second node, wherein the one preamble, the downlink data section and the uplink data section are comprised in the single frame, in the receiving of the downlink data in units of slots in the downlink section, the at least one second node receives the one preamble only once before receiving the downlink data in a first slot of the plurality of downlink-dedicated slots, with no preamble sent in the subsequent slots, in the transmitting of the uplink data in units of slots in the uplink section, the at least one second node does not transmit any preamble to the first node, wherein downlink data of the first slot of the plurality of downlink-dedicated slots includes an Urtdn SIGnalling (U-Sig) header and a data field (MAC protocol data unit (MPDU)).

10. The method of claim 9,
wherein downlink data of remaining slots of the plurality of downlink-dedicated slots except the first slot includes DownlinkPHY header (DPH) and a data field (MAC protocol data unit (MPDU)).

11. The method of claim 10, wherein the downlink section further includes an end of downlink (EOD) field after the downlink data section, and
the EOD field is used to indicate uplink and downlink transmission switching and switch a transmission/reception mode after continuous downlink data reception.

12. The method of claim 10, wherein the downlink header (DPH) includes a guard interval (GI) and a downlink training field (DTF).

13. The method of claim 9, wherein
the uplink data includes an uplink header (uplink PHY header (UPH)) and a data field (MAC protocol data unit (MPDU)).

14. The method of claim 13, wherein the uplink header (UPH) includes a guard interval (GI) and an uplink training field (UTF).

15. The method of claim 9, wherein, in the transmitting of the uplink data in units of slots, the second node of a first slot in the uplink section transmits the corresponding uplink data to the first node in a first slot after an end of downlink (EOD) following continuous downlink data reception.

16. An apparatus for radio communication of a time sensitive network, comprising:
a memory;
a transceiver; and
a processor connected to the memory and the transceiver,
wherein the processor divides a single frame into a downlink section and an uplink section, transmits downlink data to at least one second node through the transceiver in units of slots in the downlink section, and receives uplink data from the at least one second node in units of slots in the uplink section, wherein the downlink section includes a plurality of downlink-dedicated slots and the uplink section includes a plurality of uplink-dedicated slots, wherein the downlink section includes one preamble and a downlink data section including the downlink data in units of slots for each of the at least one second node, wherein the uplink section includes an uplink data section including the uplink data in units of slots for each of the at least one second node, wherein the one preamble, the downlink data section and the uplink data section are comprised in the single frame, in the transmitting of the downlink data in units of slots in the downlink section, the processor transmits the one preamble only once before transmitting the downlink data in a first slot of the plurality of downlink-dedicated slots, with no preamble sent in the subsequent slots, in the receiving of the uplink data in units of slots in the uplink section, the process does not receive any preamble from the at least one second node, wherein downlink data of the first slot of the plurality of downlink-dedicated slots includes an Urtdn SIGnalling (U-Sig) header and a data field (MAC protocol data unit (MPDU)).

17. The apparatus of claim 16, wherein the processor transmits a preamble only once before transmitting the downlink data in a first slot of the plurality of downlink-dedicated slots in the downlink section, with no preamble sent in the subsequent slots.

* * * * *